W. M. SULLIVAN.
AUTOMOBILE WHEEL.
APPLICATION FILED SEPT. 13, 1917.

1,272,723.

Patented July 16, 1918.

INVENTOR
WILLIAM M. SULLIVAN.
BY Hazard & Miller
ATTYS

UNITED STATES PATENT OFFICE.

WILLIAM M. SULLIVAN, OF ARCADIA, CALIFORNIA.

AUTOMOBILE-WHEEL.

1,272,723.   Specification of Letters Patent.   Patented July 16, 1918.

Application filed September 13, 1917. Serial No. 191,302.

*To all whom it may concern:*

Be it known that I, WILLIAM M. SULLIVAN, a citizen of the United States, residing at Arcadia, in the county of Los Angeles and State of California, have invented new and useful Improvements in Automobile-Wheels, of which the following is a specification.

This invention relates to a vehicle wheel construction.

The principal object of this invention is to provide a wheel for vehicles which is so constructed as to prevent road shock from being transmitted through the spokes to the axles of the vehicle, thus taking considerable vibrating strain from the vehicle body.

Another object of this invention is to provide a vehicle wheel of an all metal construction, the parts of which may be easily manufactured and readily assembled.

Other objects will appear hereinafter.

The invention is illustrated, by way of example, in the accompanying drawings in which.

Figure 1:
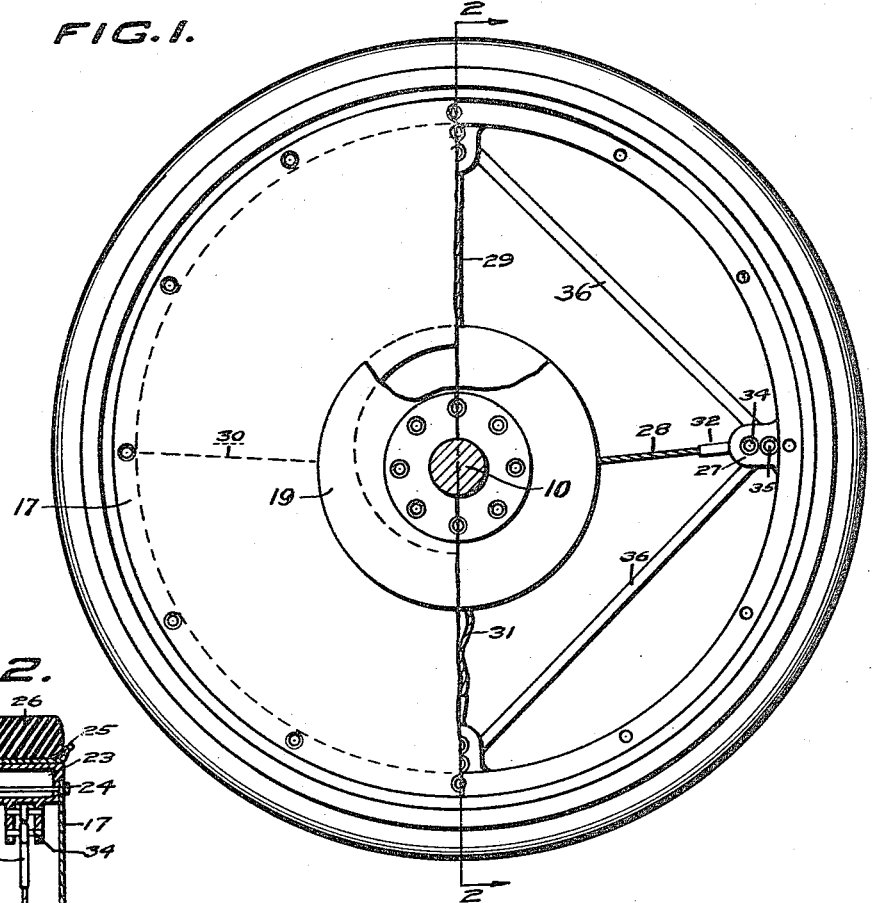
Figure 1 is a view in side elevation illustrating the vehicle wheel with which the present invention is concerned, with parts broken away to clearly show its construction.
Figure 2:
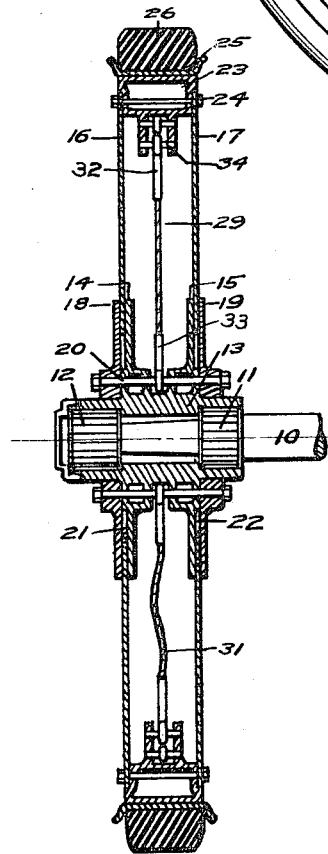
Fig. 2 is a view in transverse section as seen on the line 2—2 of Fig. 1, further disclosing the correlation of the various elements.
Figure 3:
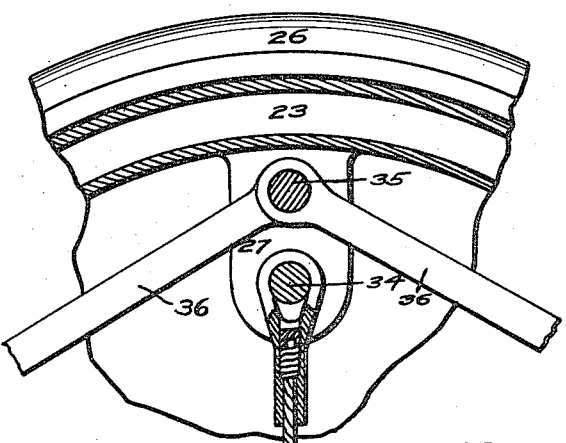
Fig. 3 is a fragmentary view drawn on an enlarged scale illustrating the spoke and reinforcing stay connection to the rim of the wheel.

Referring more particularly to the drawings, 10 indicates a vehicle axle upon which are here shown roller bearings 11 and 12. Mounted upon these bearings is a hub casting 13 within the opposite ends of which the bearings are seated. This casting is formed with an enlarged central portion and parallel spaced flanges 14 and 15 against the outer faces of which wheel side disks 16 and 17 bear. Circular bolting flanges 18 and 19 are secured to the hub and are held in sliding relation to the side disks by means of clamping bolts 20. The flanges upon the hub and the bolting flanges are of the same diameter and are held in spaced relation to each other by shoulders on the hub which form circular slots 21 and 22 within which the disks are positioned. It will be understood that the side disks 16 and 17 are formed with bores through which the hub extends. These bores are of larger diameter than the diameter of the hub and permit a latitude of movement between the disks and the hub.

Disposed around the outer peripheries of the disks and therebetween is a pressed metal felly 23 to which the disks are firmly bolted by bolts 24. This felly is designed to receive a tire rim 25 upon which is mounted a cushion tire 26.

Formed at intervals around the inner periphery of the wheel felly are inwardly extending ears 27 to which spokes are fastened. As here shown, there are four pairs of these ears accommodating spokes 28, 29, 30 and 31. The spokes are formed of cable having fittings 32 and 33 at their opposite ends. Each of the fittings 32 is secured between a pair of ears by a pin 34 while the fitting 33 upon the opposite end of each spoke is mounted upon one of the bolts 20 by which the flanges of the hub are secured in place. Pins 35 also extend through the ears to receive the ends of stays 36 which are arranged diagonally from ear to ear.

The spokes are all of the same length but are of a greater length than the normal radial distance between the bolts 20 and the pins 34. Due to this arrangement the center of the hub will at all times be below the center of the felly, thus holding the uppermost of the spokes taut and the lowermost loose.

In operation, the wheel is assembled as shown in the drawings and fitted with a suitable cushion tire, after which it may be mounted upon a vehicle and used. When the wheels are resting upon the ground and the spokes are in the position shown in Fig. 1 of the drawings, the weight carried by the axle will be directly suspended upon the spoke 29 and held centrally by the spokes 28 and 30. In case of a shock upon the wheel the axle may momentarily remain stationary to permit the wheel to slide in relation to its hub, this being allowed by the excessive lengths of the spokes and also by the slidable connection between the side disks 16 and 17 and the hub flanges. It will be evident that by this suspension of the axle the hub will have a floating movement independent of the rim.

It will thus be seen that by the use of this device the greater part of the road shock delivered to the rim will be lost and that an easy riding wheel will be produced.

While I have shown the preferred construction of my automobile wheel as now known to me, it will be understood that various changes in the combination, construction and arrangement of parts may be made by those skilled in the art without departing from the spirit of my invention as claimed.

I claim:

An automobile wheel comprising the combination with an axle having roller bearings, of a hub mounted upon the bearings; said hub having an enlarged central portion and rigid parallel spaced flanges extending outwardly around the central portion; circular bolting flanges secured to the hub and spaced from the rigid flanges, wheel side disks slidingly mounted between the bolting flanges and rigid flanges; said side disks having central bores through which the hub extends loosely; a pressed metal felly secured between and against the outer peripheries of the side disks, ears extending inwardly at spaced intervals around the felly, cables secured to the hub and extending radially and secured to the ears; said cables being slightly loose so as to allow the hub to sag; and cable stays connected to adjacent ears.

In testimony whereof I have signed my name to this specification.

WILLIAM M. SULLIVAN.